(12) United States Patent
Taylor et al.

(10) Patent No.: US 10,540,714 B1
(45) Date of Patent: Jan. 21, 2020

(54) FINANCIAL ANALYSIS IN A COMPUTING ENVIRONMENT

(71) Applicant: Capital One Services, LLC, McLean, VA (US)

(72) Inventors: Christopher Taylor, Plainview, NY (US); Kelly Cravens, Arlington, VA (US); Nina Makan, Plainview, NY (US); Vivek Simkhada, Arlington, VA (US); Lun Zhang, Oakton, VA (US); Bonnie Henry, West Springfield, VA (US); Patricia Graziose, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/409,303

(22) Filed: May 10, 2019

(51) Int. Cl.
*G06Q 40/02* (2012.01)
*G06Q 30/06* (2012.01)

(52) U.S. Cl.
CPC ......... *G06Q 40/02* (2013.01); *G06Q 30/0631* (2013.01)

(58) Field of Classification Search
CPC .............................. G06Q 40/02; G06Q 30/06
See application file for complete search history.

(56) References Cited

U.S. PATENT DOCUMENTS

| | | | |
|---|---|---|---|
| 8,768,809 B1 | 7/2014 | Cole et al. | |
| 2003/0172013 A1* | 9/2003 | Block | G06Q 30/02 705/33 |
| 2004/0122757 A1* | 6/2004 | Wang | G06Q 40/00 705/35 |
| 2004/0172360 A1* | 9/2004 | Mabrey | G06Q 20/102 705/40 |
| 2006/0041487 A1* | 2/2006 | Santalo | G06Q 20/102 705/30 |

(Continued)

FOREIGN PATENT DOCUMENTS

WO    WO-0184388 A2 * 11/2001    ......... G06Q 10/087

OTHER PUBLICATIONS

Spire: Managing Accounts Receivables and Accounts Payable, Sep. 20, 2016, pp. 1-3. (Year: 2016).*

(Continued)

*Primary Examiner* — Bijendra K Shrestha

(57) ABSTRACT

Techniques for providing a cash flow tool that analyzes financial transaction data for a customer to address any determined inefficient activities of the customer are provided. Financial transaction for the customer can be received. The financial transaction data can include payables transaction data and receivables transaction data. A first inefficient activity of the customer can be determined based on the payables transaction data. A second inefficient activity of the customer can be determined based on the receivables transaction data. A first recommendation to address the first inefficient activity and a second recommendation to address the second inefficient activity can be determined based on services or products available to the customer. The first and second recommendations can be displayed to the customer in a simplified and user-friendly manner to facilitate efficient review and discussion with a representative.

20 Claims, 16 Drawing Sheets

(56) References Cited

U.S. PATENT DOCUMENTS

2008/0021830 A1* 1/2008 Apergis ............... G06Q 20/042
                                                    705/45
2012/0123807 A1* 5/2012 Seaver ................. G06Q 40/08
                                                    705/4

OTHER PUBLICATIONS

Spire: Managing Accounts Receivable and Account Payable, Sep. 20, 2016, pp. 1-3 (Year: 2016).*
Singh, Abhishek: Small business accounting 101: Address 6 key accounting challenges with technology, Nov. 26, 2018, pp. 1-21 (Year: 2018).*
United Nations Economic Commission for Europe: Making Data Meaningful Part 2: A guide for presenting statistics, 2009, United Nations, Geneva, pp. 1-58. (Year: 2009).*

* cited by examiner

| Measure | Excellent | Point Value | Needs Attention | Point Value |
|---|---|---|---|---|
| Checks >0 ( Positive Pay / Reverse Positive Pay) | Yes | 4 | No | 0 |
| Cash (deposits) | No | 2 | Yes | 0 |
| Cash (withdraws) | No | 2 | Yes | 0 |
| ACH Positive Pay / ACH Full Block / ACH Filters | Yes | 4 | No | 0 |
| Commercial Card/Spark | Yes | 2 | No | 0 |
| Client Activity Account Segregation | Yes | 2 | No | 0 |

```
┌─────────────────────────────────────┐
│      Storage Medium 1200            │
│                                     │
│   ┌─────────────────────────────┐   │
│   │                             │   │
│   │    Computer Executable      │   │
│   │    Instructions for 1100    │   │
│   │                             │   │
│   └─────────────────────────────┘   │
│                                     │
└─────────────────────────────────────┘
```

FIG. 12

FINANCIAL ANALYSIS IN A COMPUTING ENVIRONMENT

TECHNICAL FIELD

Embodiments described herein generally relate to managing financial transaction data.

BACKGROUND

Conventional financial analysis tools do not provide a client with an all-inclusive automated analysis of the client's financial transaction data for a long range of time according to transaction type (e.g., by payables transaction, receivables transaction, etc.). Further, conventional financial analysis tools do not determine the client's inefficient activities as they may relate to the analyzed transactions and further fail to provide recommendations to the client for mitigating any determined inefficient activity. Accordingly, what is needed is a more efficient automated transactional analysis tool for a client that can analyze the client's financial transactions, determine inefficient activities and recommendations for addressing the determined inefficient activities while accounting for available banking services and products, and present the results to the client in a user-friendly manner.

SUMMARY OF THE DISCLOSURE

Techniques for providing a cash flow tool that analyzes financial transaction data for a customer to address any determined inefficient activities of the customer are provided. Financial transaction data for the customer can be received. The financial transaction data can include payables transaction data and receivables transaction data. A first inefficient activity of the customer can be determined based on the payables transaction data. A second inefficient activity of the customer can be determined based on the receivables transaction data. A first recommendation to address the first inefficient activity and a second recommendation to address the second inefficient activity can be determined based on services or products available to the customer. The first and second recommendations can be displayed to the customer in a simplified and user-friendly manner to facilitate efficient review and discussion with a representative.

BRIEF DESCRIPTION OF THE DRAWINGS

FIG. 4 illustrates a chart of analyzed transactions that relate to possible financial loss.
FIGS. 10A-10C illustrate additional user interfaces.
FIG. 12 illustrates a storage medium.

DETAILED DESCRIPTION

This disclosure presents various systems, components, and methods related to managing and analyzing financial transaction data and providing means to improve the financial health of a customer. Each of the systems, components, and methods disclosed herein provides one or more advantages over conventional systems, components, and methods.

Various embodiments include techniques for providing a cash flow tool (or financial analysis within a computing environment) that analyzes financial transaction data for a customer to address any determined inefficient activities of the customer. As used herein, a "customer" or "client" may refer to a person, business, or any other entity having one or more accounts with a financial institution that may use the cash flow tool. Financial transaction data for the customer may be received. The financial transaction data can include payables transaction data and receivables transaction data. A first inefficient activity of the customer may be determined based on the payables transaction data. A second inefficient activity of the customer may be determined based on the receivables transaction data. A first recommendation to address the first inefficient activity and a second recommendation to address the second inefficient activity may be determined based on services or products available to the customer. The first and second recommendations may be displayed to the customer in a simplified and user-friendly manner to facilitate efficient review and discussion with a representative.

The cash flow tool enables a customer to quickly and efficiently generate a financial analysis for the customer. The cash flow tool can provide the customer with a consolidated summary of financial data for the customer and can quickly identify inefficient activities of the customer that can lead to low cash flow, inefficient use of time, and/or an increased likelihood of financial loss. The customer can then review recommendations to address the identified inefficient activity to remedy or improve the activity. Other embodiments are also disclosed and described.

Figure 1:
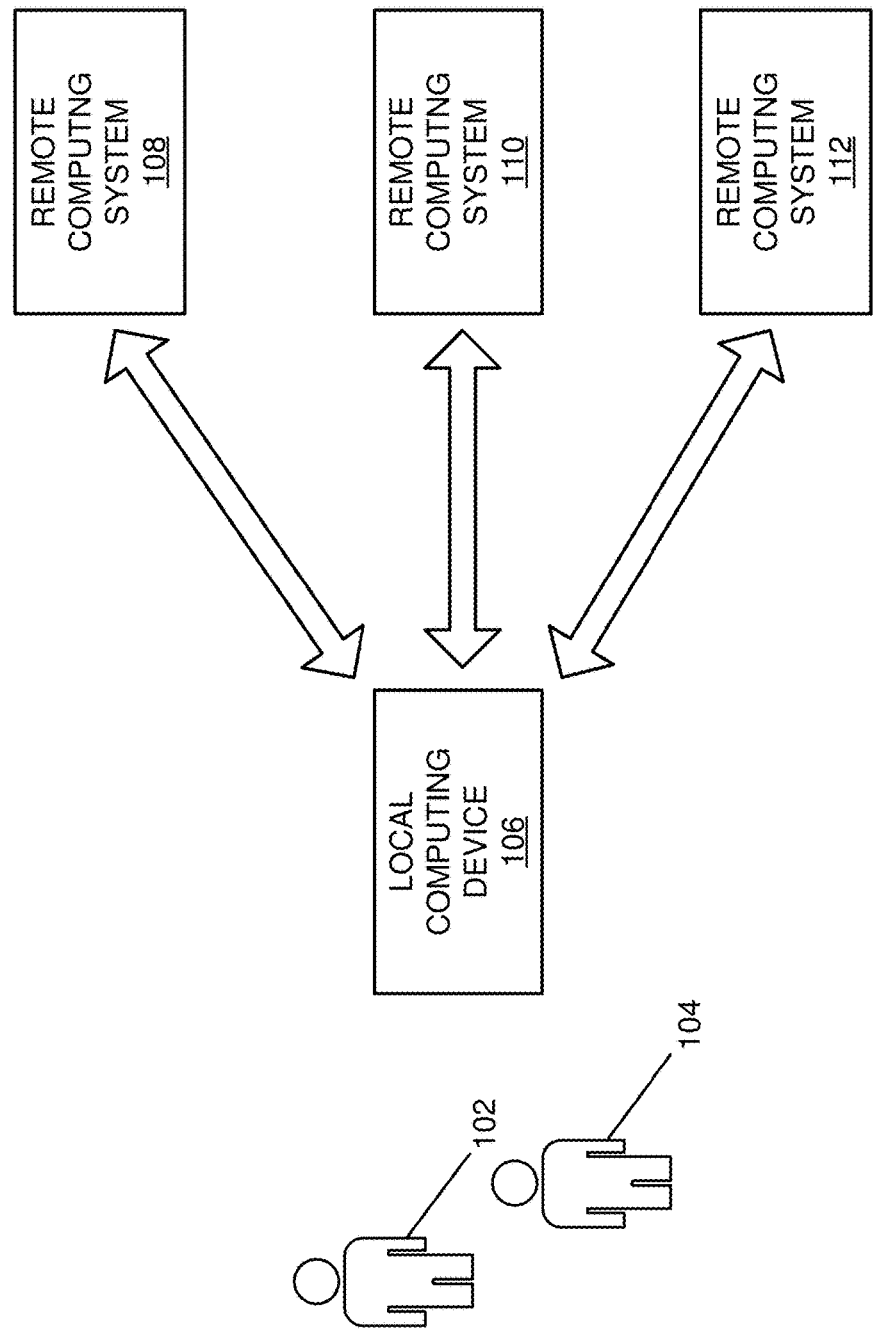
FIG. 1 illustrates an operating environment.

FIG. 1 illustrates an operating environment 100 such as may be representative of various embodiments in which techniques for providing a cash flow tool may be implemented. As shown, the operating environment 100 can include a user 102, a customer 104, a computing device 106, a first remote computing system 108, a second remote computing system 110, and a third remote computing system 112. The computing device 106 can communicate with the first, second, and third remote computing systems 108-112 over any communication medium based on any known communication protocol or standard. Similarly, the first, second, and third remote computing systems 108-112 may communicate with each other over any communication medium based on any known communication protocol or standard.

The first, second, and third remote computing systems 108-112 may be any type of computing device including a server or can represent a computer network, a cloud-based computing system, a database, or any other computer networking component and/or electronic computing device or storage device. The computing device 106 may be a local computing device (e.g., relative to the user 102 and the customer 104) and can include any type of electronic computing device such as, for example, a desktop, a laptop, a tablet, a notebook, or a mobile device. The operating environment 100 illustrates three remote computing systems 108-112 communicatively coupled to the computing device 106 but is not so limited. In general, the operating device 100 can include any number of remote computing systems communicatively coupled to the computing device 106.

The customer 104 (or client) may be a customer of a financial institution such as, for example, a financial institution that provides the cash flow tool described herein. The user 102 may be an employee of the financial institution. The user 102 can operate the computing device 106 to provide and/or operate the cash flow tool to the customer 104 and/or to display outputs or results of the cash flow tool.

As described herein, the cash flow tool can include or can provide a visual display, e.g., a graphical user interface (GUI), on the computing device 106, for example, of the transactional data (e.g., financial transaction data) of the customer 104 (or a consolidated version thereof). The transactional data may be received in one or more data streams from the first, second, and third remote computing systems 108-112 (e.g., from at least one of a plurality of computing devices or systems). The transactional data can include one or more payables transactions, one or more receivables transactions, and/or one or more transactions that can relate to a financial loss or a possible financial loss.

The collected transactional data may be collected and analyzed according to one or more criteria, measures, and/or metrics by the cash flow tool. Inefficient and/or efficient transactional activity or behavior of the customer 104 may be determined based on analysis of the collected transactional data. Based on the determined inefficient activity of the customer 104, one or more recommendations may be provided to the customer 104 as determined by the cash flow tool. The user 102 can provide the displayed analysis from the cash flow tool to the customer 104 for review.

Conventional transaction analysis tools do not provide the customer 104 with a holistic view of the transactions of the customer 104—for example, by analyzing a type of each financial transaction and whether or not each transaction was inefficiently conducted or managed based on enrollment in or use of certain banking products or services. The cash flow tool described herein provides recommendations and rationales to the customer 104 based on analysis of the transactions of the customer 104. The user 102 can act as a guide of the cash flow tool to enhance the experience of the customer 104 when using or being provided the outputs of the cash flow tool.

As described herein, any of the depicted computing devices shown in FIG. 1 can provide or implement all or a portion of the cash flow tool as described herein. In an embodiment, transaction data for the customer 104 may be collected from one or more data streams from the remote computing systems 108-112. The collected data may be analyzed by one or more of the remote computing systems 108-112 and/or the computing device 106 with outputs displayed by the computing device 106. In another embodiment, the computing device 106 can perform any analysis provided by the cash flow tool.

The cash flow tool as described herein can generate criteria or metrics and corresponding scoring based on industry standards, industry data, and/or data from similar type customers. For example, the customer 104 may be a small business owner. Accordingly, the cash flow tool may analyze the transactional data of the customer 104 based on data, metrics, criteria, etc. associated or related to other small business owners. In an embodiment, the cash flow tool may include or use machine learning or machine learning techniques to analyze data (e.g., industry data) to develop metrics, criteria, and/or corresponding scoring for comparison to the transactional data of the customer 104. In an embodiment, the cash flow tool may be provided through a web interface or other computer interface.

Figure 2:
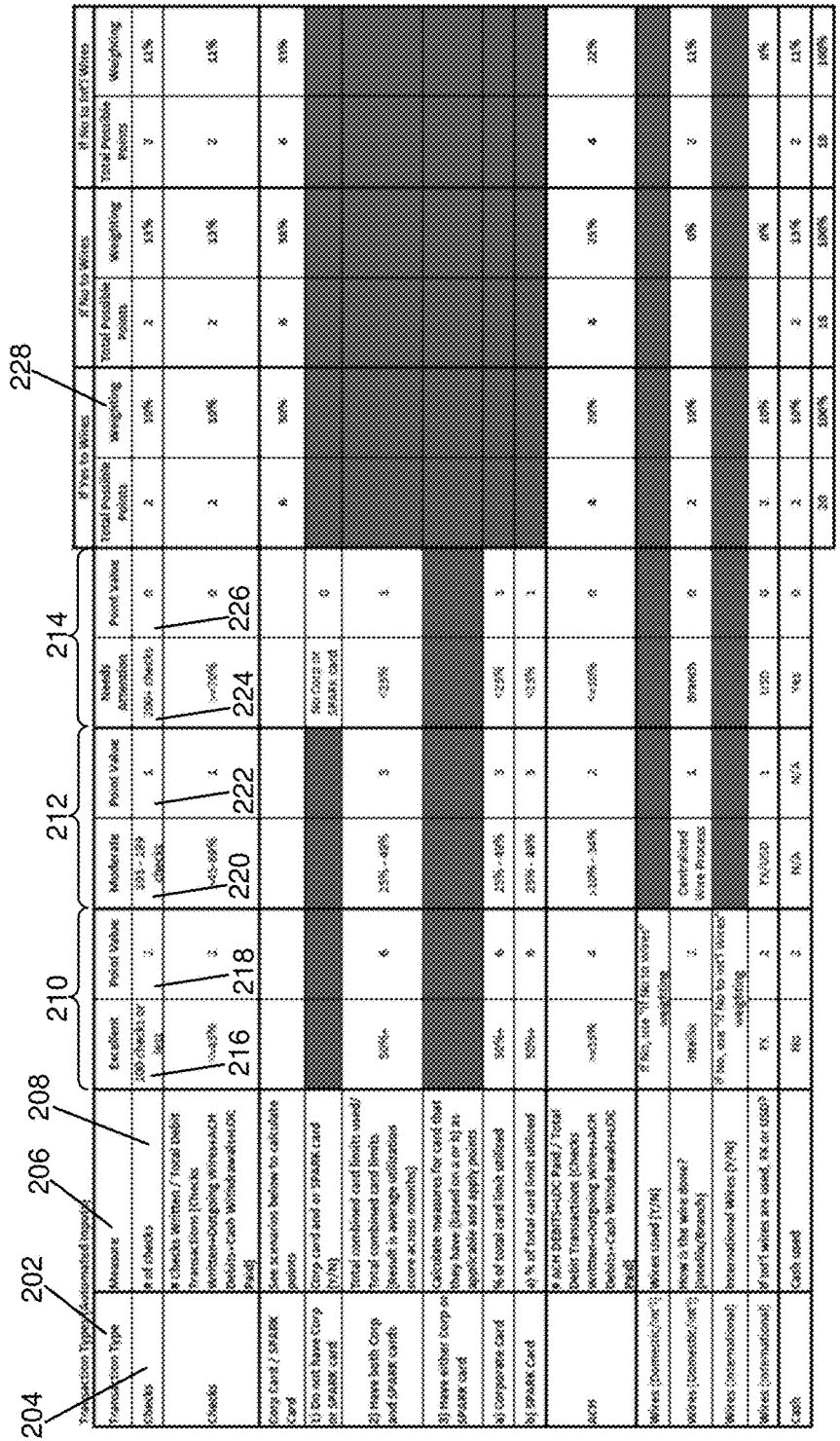
FIG. 2 illustrates a chart of analyzed payables transactions.

FIG. 2 illustrates an example of an analysis of payables transaction data of the customer 104 provided by the cash flow tool described herein. FIG. 2 specifically illustrates a chart 200 of analyzed payables transactions. The payables transactions can represent financial transaction data of the customer 104 involving a current or fulfilled obligation of the customer 104 (e.g., an amount of money or credit owed to another entity or paid to another entity). In an embodiment, the payables transaction data provided in the chart 200 may be for a desired period of time such as, for example, 12 months or some customized period of time. The chart 200 may be used for analyzing and/or scoring activities of the user that relate to payables transactions to flag both efficient and inefficient activities of the customer 104. Based on any determined inefficient activity, one or more recommendations for correcting the inefficient activity may be determined by the cash flow tool.

As shown in FIG. 2, the chart 200 presents the payables transaction data according to a type of the payables transaction 202. As an example, a first type of payables transaction may be a check transaction 204 (e.g., where the check transaction 204 represents payable transactions of the type that involves checks). Other payables transactions are provided in the chart 200 under the column designated as including the type of payables transaction 202 as shown.

As further shown in FIG. 2, the chart 200 includes a measure or metric 206 corresponding to each listed type of payables transaction 202. As an example, for check transactions 204, a corresponding measure of a number of checks 208 is provided (e.g., as a measure of a total number of checks used by the customer 104).

For each payables transaction type 202 and measure 206 pairing, a scoring of the activity of the customer 104 may be determined. In an embodiment, the scoring may be broken into three categories—a first category 210, a second category 212, and a third category 214. In general, any number of categories may be used. The first category 210 can represent a high scoring or positive payables transaction activity. The second category 212 can represent a medium scoring or neutral payables transaction activity. The third category 214 can represent a low scoring or negative payables transaction activity. Each scoring category can include a threshold or data comparison component and a point value. In this manner, a value of a payables transaction may be compared to the threshold for each scoring category 210-214 and an assigned value for the payables transaction may be determined. Based on the assigned value, an inefficient activity of the customer 104 may be determined.

As an example, for check transactions 204, a total number of checks for the customer 104 is determined, representing a value of the payables transaction. The determined total number of checks is compared to a first threshold 216 of the first category 210. If the determined total number of checks falls within the first category 210 based on comparison to the first threshold 216, then a first corresponding point value 218 is assigned to the check transactions 204. The determined total number of checks can then be compared to a second threshold 220 of the second category 212. If the determined total number of checks falls within the second category 212 based on comparison to the second threshold 220, then a second corresponding point value 222 is assigned to the check transactions 204. The determined total number of checks can then be compared to a third threshold 224 of the third category 214. If the determined total number of checks falls within the third category 214 based on comparison to the third threshold 224, then a third corresponding point value 226 is assigned to the check transactions 204.

In this manner, payables transaction data of the customer 104 may be analyzed to determine a payables transaction type 202. After determining the payables transaction type 202, a value of the payables transaction data may be determined based on a corresponding (e.g., assigned) measure or metric. The value of the payables transaction can then be scored by comparing the value of the payables transaction to various thresholds—e.g., the first threshold 216, the second threshold 220, and the third threshold 224—and then assigning the payables transaction a point value—e.g., one of the corresponding first point value 218, the second point value 222, or the third point value 226—based on the results of the comparison.

In general, a wide range of payables transactions and/or payables transaction data of the customer 104 may be reviewed and analyzed as shown in FIG. 2. The chart 200 can represent a display of the cash flow tool presented to the customer 104 (e.g., on the computing device 106) and/or can represent the scoring and/or analysis conducted by the cash flow tool as described herein. Based on the scoring and/or analysis described in relation to the chart 200, one or more inefficient and/or one or more efficient activities of the customer 104—in relation to conducting payables transactions—may be determined.

In various embodiments, as shown in FIG. 2, a weighting factor 228 may reflect the weight a point value for a given metric carries when considering the total possible point values across all metrics (e.g., the 2 possible points for number of checks is 10% of the 20 total possible points). In some embodiments, the weighting factor 228 may be applied to the point total for a metric when computing a score for the user (e.g., across all metrics in FIG. 2). Further, in various embodiments, any threshold and/or corresponding point value may be set based on industry data or other metrics and/or based on data from customers similar to those of the customer 104. That is, any threshold and/or corresponding point value can be set based on any other information collected by the cash flow tool (e.g., any industry related data analyzed by a machine learning component). For example, a threshold and corresponding point value (e.g., the first threshold 216 and first corresponding point value 218) may be based on data collected for other small business owners similar to the customer 104. In various embodiments, the cash flow tool may use artificial intelligence and/or machine learning to review industry-wide data and/or related customer data to set or adjust any threshold and/or corresponding point value, such that the scoring and/or analysis conducted by the cash flow tool for the customer 104 reflects real-world activities and/or financial transaction data.

Overall, the chart 200 shows a variety of different payables transaction types, measures for evaluating a particular payables transaction type, various thresholds for comparing a value of a payables transaction type along with corresponding scoring point values, and weighting factors that may be used in an exemplary implementation of the cash flow tool as described herein. The scoring and/or point value may be a numerical value as shown in FIG. 2.

Figure 3:
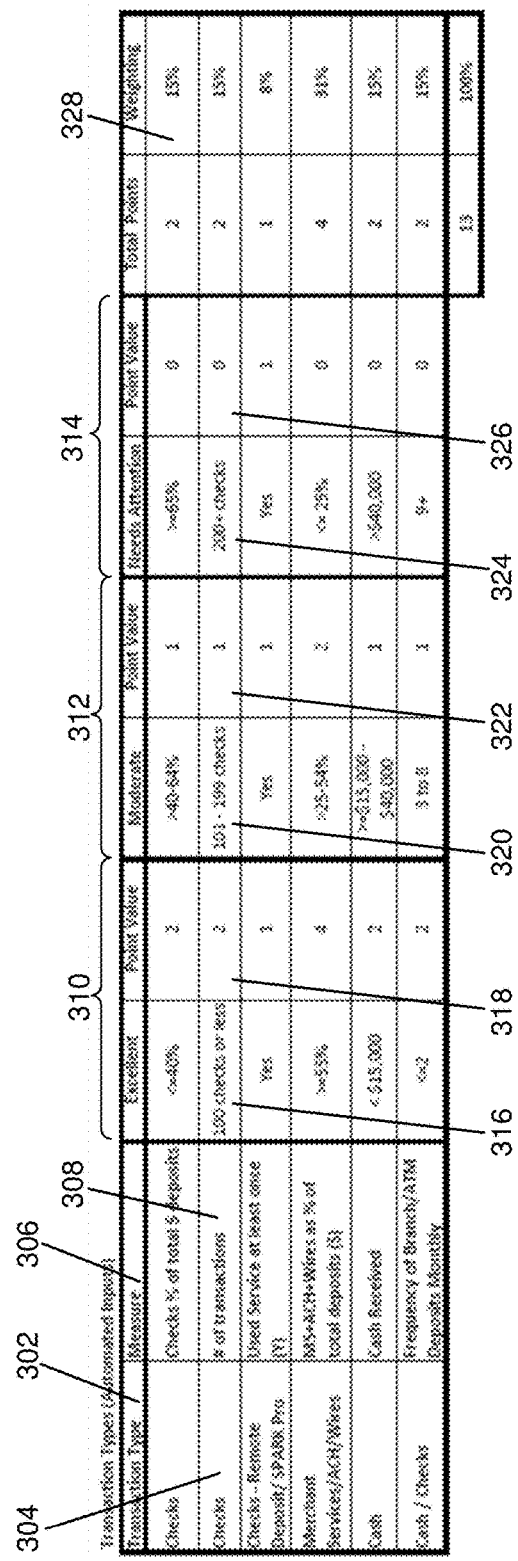
FIG. 3 illustrates a chart of analyzed receivables transactions.

FIG. 3 illustrates an example of an analysis of receivables transaction data of the customer 104 provided by the cash flow tool described herein. FIG. 3 specifically illustrates a chart 300 of analyzed receivables transactions. The receivables transactions can represent financial transaction data of the customer 104 involving an outstanding or fulfilled obligation owed to the customer 104 (e.g., an amount of money owed or paid to the customer from another entity). In an embodiment, the receivables transaction data provided in the chart 300 may be for a desired period of time such as, for example, 12 months or some customized period of time.

As shown in FIG. 3, the chart 300 presents the receivables transaction data according to a type of the receivables transaction 302. As an example, a first type of receivables transaction may be a check transaction 304 (e.g., where the check transaction 304 represents receivables transactions of the type that involve checks). Other receivables transactions are provided in the chart 300 under the column designated as including the type of receivables transaction 302 as shown.

As further shown in FIG. 3, the chart 300 includes a measure or metric 306 corresponding to each listed type of receivables transaction 302. As an example, for check transactions 304, a corresponding measure of a number of checks 308 is provided (e.g., as a measure of a total number of checks received by the customer 104).

For each receivables transaction type 302 and measure 306 pairing, a scoring of the activity of the customer 104 may be determined. In an embodiment, the scoring may be broken into three categories—a first category 310, a second category 312, and a third category 314. In general, any number of categories may be used. The first category 310 can represent a high scoring or positive receivables transaction activity. The second category 312 can represent a medium scoring or neutral receivables transaction activity. The third category 314 can represent a low scoring or negative receivables transaction activity. Each scoring category can include a threshold or data comparison component and a point value. In this manner, a value of a receivables transaction may be compared to the threshold for each scoring category and an assigned value for the receivables transaction may be determined. Based on the assigned value, an inefficient activity of the customer 104 may be determined.

As an example, for check transactions 304, a total number of checks for the customer 104 is determined, representing a value of the receivables transaction. The determined total number of checks is compared to a first threshold 316 of the first category 310. If the determined total number of checks falls within the first category 310 based on comparison to the first threshold 316, then a first corresponding point value 318 is assigned to the check transactions 304. The determined total number of checks can then be compared to a second threshold 320 of the second category 312. If the determined total number of checks falls within the second category 312 based on comparison to the second threshold 320, then a second corresponding point value 322 is assigned to the check transactions 304. The determined total number of checks can then be compared to a third threshold 324 of the third category 314. If the determined total number of checks falls within the third category 314 based on comparison to the third threshold 324, then a third corresponding point value 326 is assigned to the check transactions 204.

In this manner, receivables transaction data of the customer 104 may be analyzed to determine a receivables transaction type 302. After determining the receivables transaction type 302, a value of the receivables transaction data may be determined based on a corresponding (e.g., assigned) measure or metric. The value of the receivables transaction can then be scored by comparing the value of the receivables transaction to various thresholds—e.g., the first threshold 316, the second threshold 320, and the third threshold 324—and then assigning the receivables transaction a point value—e.g., one of the corresponding first point value 318, the second point value 322, or the third point value 326—based on the results of the comparisons.

In general, a wide range of receivables transactions and/or receivables transaction data of the customer 104 may be reviewed and analyzed as shown in FIG. 3. The chart 300 can represent a display of the cash flow tool presented to the customer 104 (e.g., on the computing device 106) and/or can represent the scoring and/or analysis conducted by the cash flow tool as described herein. Based on the scoring and/or analysis described in relation to the chart 300, one or more inefficient and/or one or more efficient activities of the customer 104—in relation to conducting receivables transactions—may be determined.

In various embodiments, as shown in FIG. 3, a weighting factor 328 may reflect the weight a point value for a given metric carries when considering the total possible point values across all metrics (e.g., the 2 possible points for the "checks" metric is approximately 15% of the 13 total possible points depicted in FIG. 3). In some embodiments, the weighting factor 328 may be applied to the point total for a metric when computing a score for the user (e.g., across all metrics in FIG. 3). Further, in various embodiments, any threshold and/or corresponding point value may be set based on industry data or other metrics and/or based on data collected from customers similar to those of the customer 104. For example, a threshold and corresponding point value (e.g., the first threshold 316 and first corresponding point value 318) may be based on data collected for other small business owners similar to the customer 104. In various embodiments, the cash flow tool may use artificial intelligence and/or machine learning to review industry-wide data and/or related customer data to set or adjust any threshold and/or corresponding point value, such that the scoring and/or analysis conducted by the cash flow tool for the customer 104 reflects real-world activities and/or financial transaction data.

Overall, the chart 300 shows a variety of different receivables transaction types, measures for evaluating a particular receivables transaction type, various thresholds for comparing a value of a receivables transaction type along with corresponding scoring point values, and weighting factors that may be used in an exemplary implementation of the cash flow tool as described herein. The scoring and/or point value may be a numerical value as shown in FIG. 3.

FIG. 4 illustrates an example of an analysis of loss prevention transaction data of the customer 104 provided by the cash flow tool described herein. The loss prevention transaction data may represent transactions that can lead to possible financial loss based on payables transaction data and/or receivables transaction data. FIG. 4 specifically illustrates a chart 400 of analyzed transactions (e.g., either payables or receivables transaction) that can relate to possible financial loss. In an embodiment, the transaction data provided in the chart 400 may be for a desired period of time such as, for example, 12 months or some customized period of time.

As shown in FIG. 4, the chart 400 includes various measures or metrics 402 for evaluation. As an example, making cash deposits 404 may be a metric or measure used for analysis. As part of the analysis, as described herein, it may be determined if cash deposits are used by the customer 104.

For each measure 402, a scoring may be provided. In an embodiment, the scoring may be broken into two categories—a first category 406 and a second category 408. In general, any number of categories may be used. The first category 406 can represent a high scoring or positive transaction activity that minimizes or reduces financial loss (or a risk thereof). The second category 408 can represent a low scoring or negative transaction activity (e.g., an activity that may warrant a review) that increases a likelihood of a financial loss. Each scoring category can include a threshold question component (e.g., whether or not the activity is engaged in by the customer) and a corresponding point value. In this manner, a scoring for each activity of the customer 104 may be determined such that inefficient and/or efficient activities of the customer 104 may be determined.

As an example, possible use of cash deposits 404 may be compared to the first and second categories 406 and 408. If the customer 104 does not use cash deposits, a first score or point value 410 may be assigned for the activity. If the customer does use cash deposits, a second score or point value 412 may be assigned for the activity. In this manner, a scoring of activity related to possible financial loss—e.g., based on a review of payables transactions and/or receivables transactions—may be conducted.

In general, a wide range of transactions and/or transaction data of the customer 104 may be reviewed and analyzed. The chart 400 can represent a display of the cash flow tool presented to the customer 104 (e.g., on the computing device 106) or can represent the scoring and/or analysis conducted by the cash flow tool as described herein. Based on the scoring and/or analysis described in relation to the chart 400, one or more inefficient and/or one or more efficient activities of the customer 104—in relation to conducting transactions related to possible financial loss—may be determined. The scoring and/or point value may be a numerical value as shown in FIG. 4.

Figure 5:
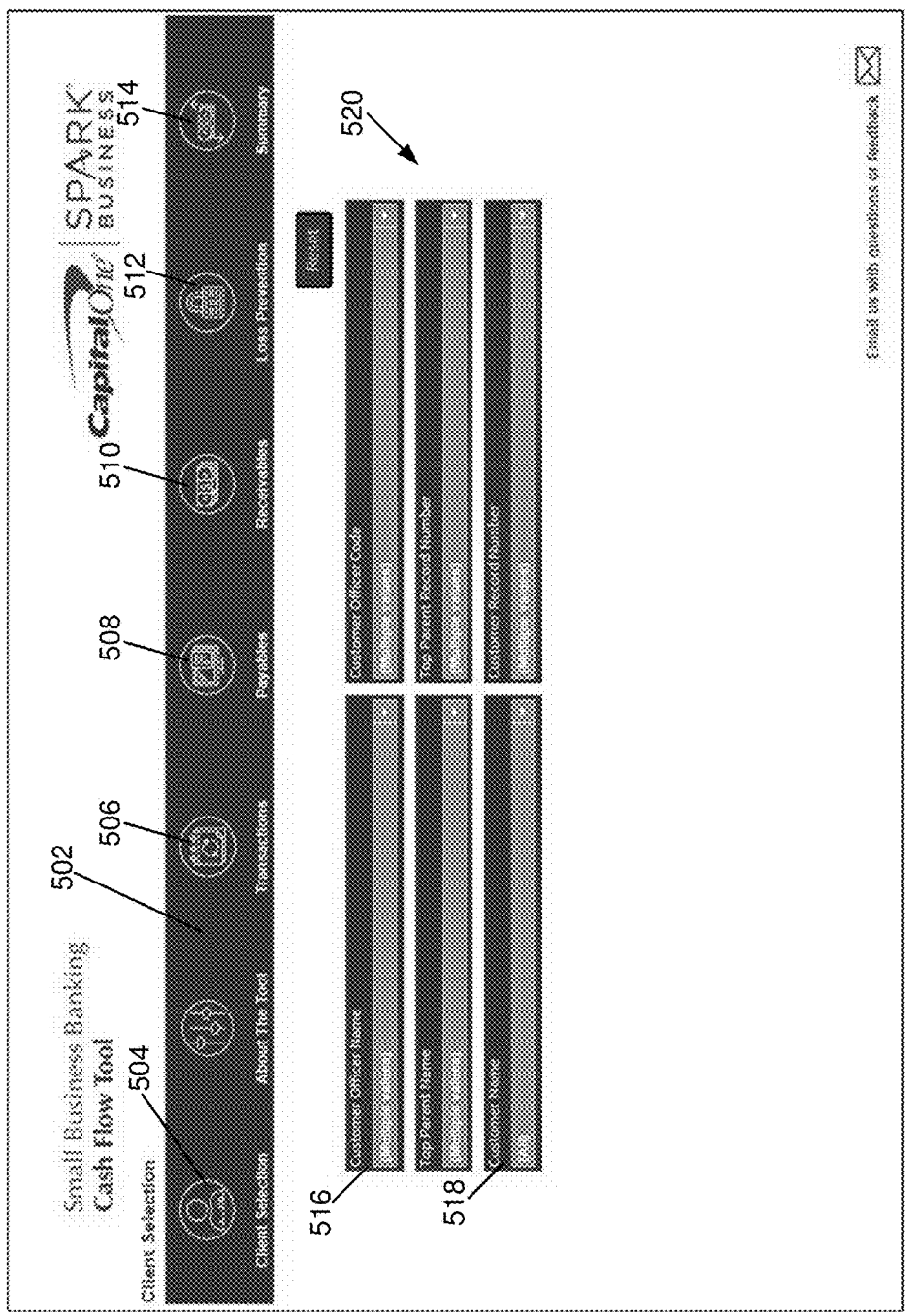
FIG. 5 illustrates a first user interface display.

FIG. 5 illustrates a display 500 that may be provided by the cash flow tool described herein. As an example, the display 500 may be presented on a display of the computing device 106 based on data provided and/or generated by the cash flow tool. The display 500 can include a presentation of textual and/or graphical information and components as shown. As shown in FIG. 5, the display 500 can include a menu bar 502. The menu bar 502 can enable selection of various components of the cash flow tool such as, for example, a client selection component 504, a transaction component 506, a payables component 508, a receivables component 510, a loss prevention component 512, and a summary component 514. The display 500 can represent a display provided to the user 102 and the customer 104 when then the client selection component 504 is selected.

The display 500 can present various selectable components for specifying the customer 104 such that transaction information related to the customer 104 may be collected and analyzed by the cash flow tool. The display 500 can also present selectable components for specifying an employee (e.g., the user 102) of an institution or entity providing the cash flow tool. As an example, a displayed component 516 may be used to specify the employee (e.g., the user 102) guiding the customer 104 through use of the cash flow tool. Further, a displayed component 518 may be used to specify the customer 104 whose transaction data will be analyzed and/or scored by the cash flow tool. The display 500 further includes other components 520 for specifying other setup information for using the cash flow tool. Any type of data entry and/or data selection component or technique may be provided by the display 500.

Figure 6:
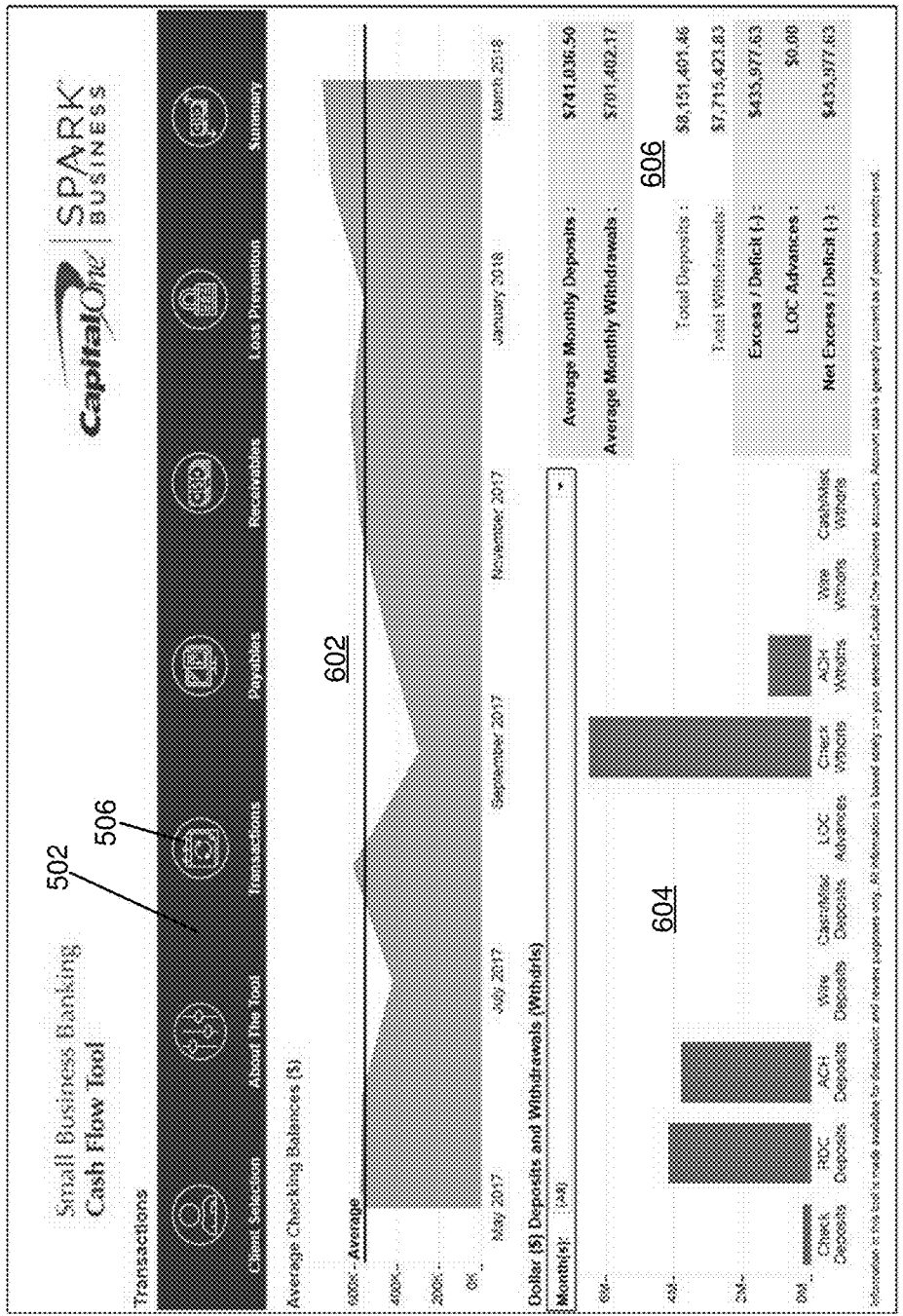
FIG. 6 illustrates a second user interface display.

FIG. 6 illustrates a display 600 that may be provided by the cash flow tool described herein. As an example, the display 600 may be presented on a display of the computing device 106 based on data provided and/or generated by the cash flow tool. The display 600 can include a presentation of textual and/or graphical information and components as shown. The display 600 can represent a display provided to the user 102 and the customer 104 when the transaction component 506 is selected from the menu bar 502.

As shown, the display 600 can provide a summary or overview of transactional data for the customer 104 (e.g., the customer specified through the display 500). The transactional data provided on the display 600 may be for any period of time (e.g., 12 months of transactional data). The transactional data may be provided and/or summarized using any combination of graphical and textual representations. As an example, the display 600 can provide a graphical representation of an average checking balance 602 of the customer 104. Further, the display 600 can provide a graphical representation of deposits and withdraws 604 of the customer 104 broken down by type and amount. Additionally, the display 600 can provide a textual, graphical, and/or numerical summary 606 of transactional data for the customer 104 as shown. Overall, the display 600 can provide a summary of transactional data for the customer 104 that may serve as the basis of data to be provided to and analyzed by the cash flow tool.

Figure 7:
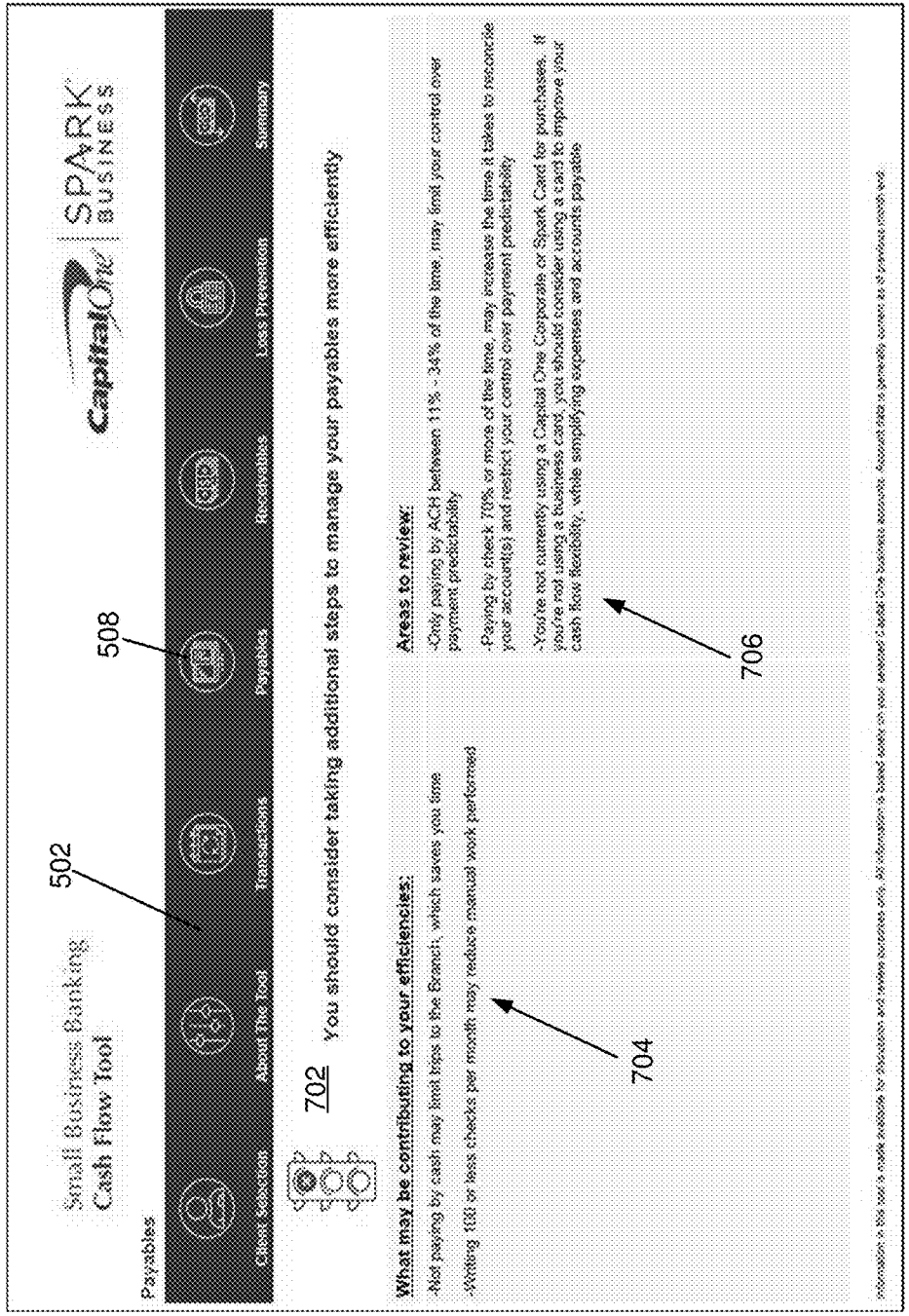
FIG. 7 illustrates a third user interface display.

FIG. 7 illustrates a display 700 that may be provided by the cash flow tool described herein. As an example, the display 700 may be presented on a display of the computing device 106 based on data provided and/or generated by the cash flow tool. The display 700 can include a presentation of textual and/or graphical information and components as shown. The display 700 can represent a display provided to the user 102 and the customer 104 when the payables component 508 is selected from the menu bar 502.

In an embodiment, the display 700 may be provided to the customer 104 based on the analysis conducted in relation to the chart 200 as depicted in FIG. 2. That is, the display 700 may be generated based on analysis and/or scoring by the cash flow tool based on a review of payables transaction data of the customer 104.

In an embodiment, the display 700 can include a notification 702 advising the customer 104 that certain activities should be reviewed or adjusted to possibly increase efficiencies of the customer 104 in relation to payables transactions. The notification 702 can include an icon or other graphical component and/or a textual description. The display 700 can also include a presentation of efficient activities 704 of the customer 104. The presentation of efficient activities 704 can include a textual and/or graphical description of behavior or activities of the customer 104 that the cash flow tool considers efficient based on any analysis conducted in relation to chart 200. The display 700 can also include a presentation of inefficient activities 706 of the customer 104. The presentation of inefficient activities 706 can include a textual and/or graphical description of behavior or activities of the customer 104 that the cash flow tool considers inefficient based on any analysis conducted in relation to chart 200.

Overall, the cash flow tool can analyze and/or score payables transaction data of the customer 104 based on, for example, the chart 200 and can generate the display 700 to summarize the analysis and/or scoring conducted. The analysis based on chart 200 can identify one or more efficient and/or one or more inefficient activities of the customer 104. The display 700 may be generated to present any determined efficient or inefficient activity to the customer 104. Any presented activity may be described textually and/or graphically with any inefficient activity also accompanied by a recommendation for addressing or correcting the determined inefficient activity. In this manner, very large amounts of payables transaction data for the customer 104 may be efficiently analyzed and presented to the customer 104 in a summarized manner to quickly identify areas or activities that may warrant review—for example, to improve the financial health of the customer 104.

Figure 8:
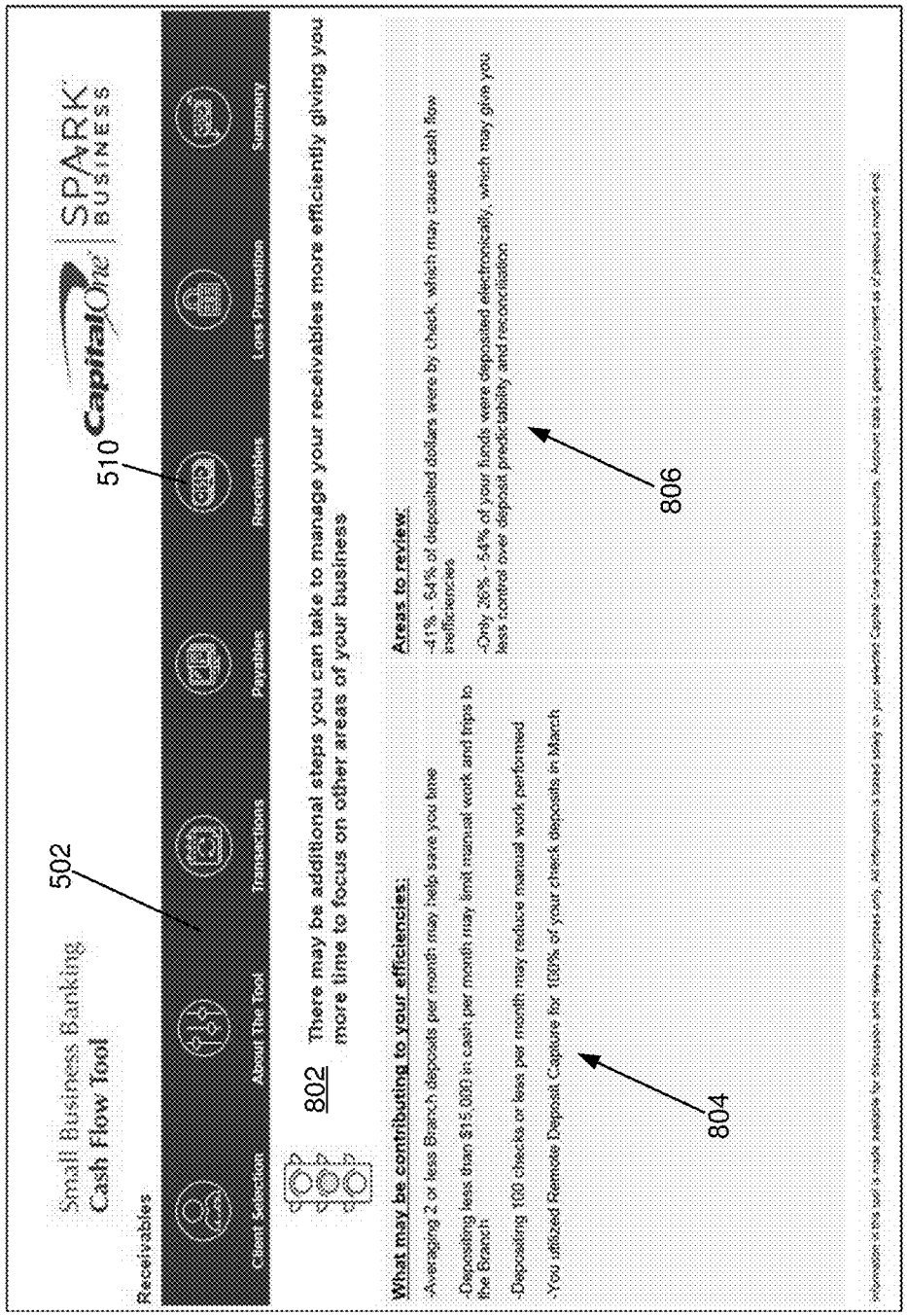
FIG. 8 illustrates a fourth user interface display.

FIG. 8 illustrates a display 800 that may be provided by the cash flow tool described herein. As an example, the display 800 may be presented on a display of the computing device 106 based on data provided and/or generated by the cash flow tool. The display 800 can include a presentation of textual and/or graphical information and components as shown. The display 800 can represent a display provided to the user 102 and the customer 104 when the receivables component 510 is selected from the menu bar 502.

In an embodiment, the display 800 may be provided to the customer 104 based on the analysis conducted in relation to the chart 300 as depicted in FIG. 3. That is, the display 800 may be generated based on analysis and/or scoring by the cash flow tool based on a review of receivables transaction data of the customer 104.

In an embodiment, the display 800 can include a notification 802 advising the customer 104 that certain activities should be reviewed or adjusted to possibly increase efficiencies of the customer 104 in relation to payables transactions. The notification 802 can include an icon or other graphical component and/or a textual description. The display 800 can also include a presentation of efficient activities 804 of the customer 104. The presentation of efficient activities 804 can include a textual and/or graphical description of behavior or activities of the customer 104 that the cash flow tool considers efficient based on any analysis conducted in relation to chart 300. The display 800 can also include a textual and/or graphical presentation of inefficient activities 806 of the customer 104. The presentation of inefficient activities 806 can include a textual and/or graphical description of behavior or activities of the customer 104 that the cash flow tool considers inefficient based on any analysis conducted in relation to chart 300.

Overall, the cash flow tool can analyze and/or score receivables transaction data of the customer 104 based on, for example, the chart 300 and can generate the display 800 to summarize the analysis and/or scoring conducted. The analysis based on chart 300 can identify one or more efficient and/or one or more inefficient activities of the customer 104. The display 800 may be generated to present any determined efficient or inefficient activity to the customer 104. Any presented activity may be described textually and/or graphically with any inefficient activity also accompanied by a recommendation for addressing or correcting the determined inefficient activity. In this manner, very large amounts of receivables transaction data for the customer 104 may be efficiently analyzed and presented to the customer 104 in a summarized manner to quickly identify areas or activities that may warrant review—for example, to improve the financial health of the customer 104.

Figure 9:
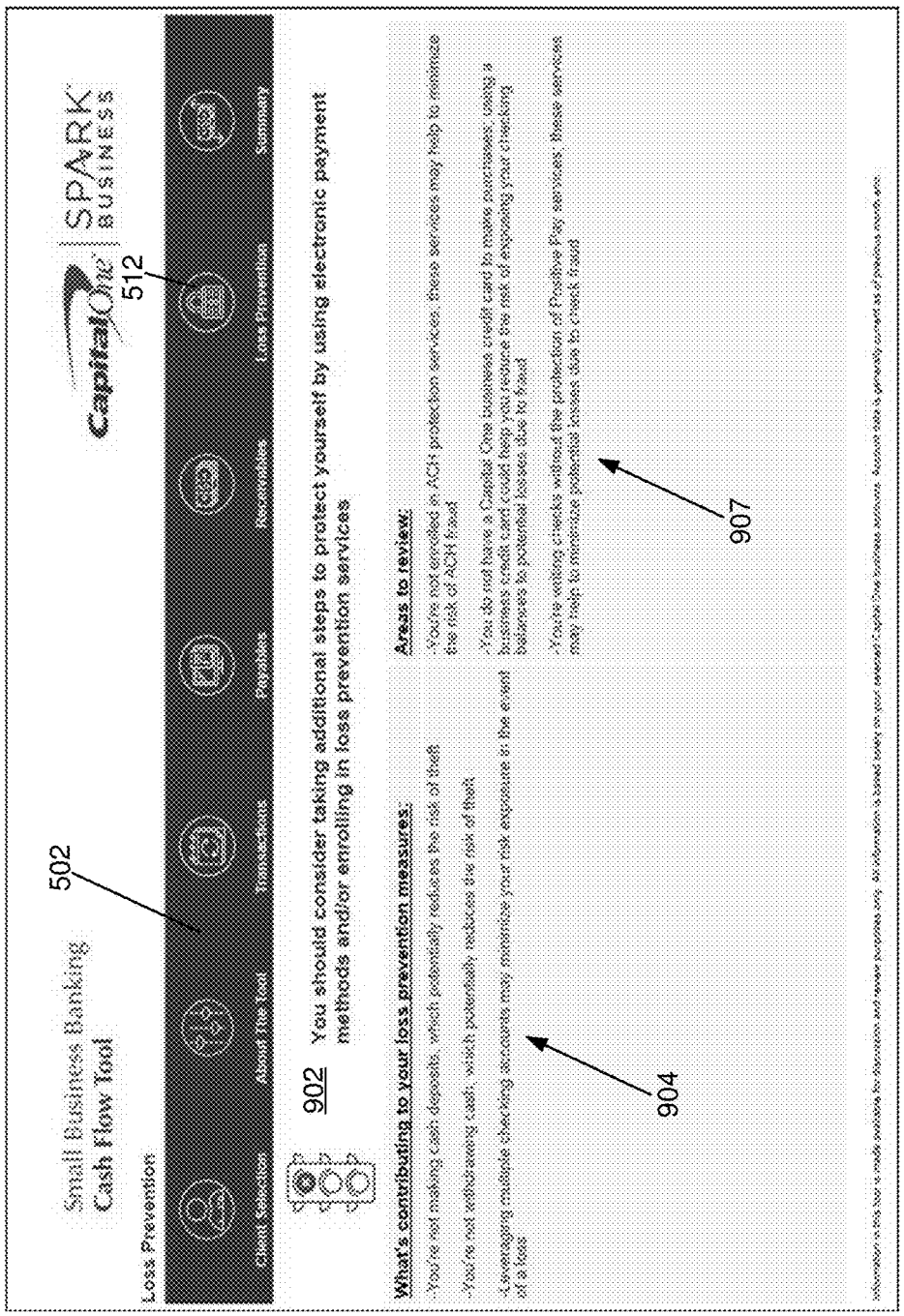
FIG. 9 illustrates a fifth user interface display.

FIG. 9 illustrates a display 900 that may be provided by the cash flow tool described herein. As an example, the display 900 may be presented on a display of the computing device 106 based on data provided and/or generated by the cash flow tool. The display 900 can include a presentation of textual and/or graphical information and components as shown. The display 900 can represent a display provided to the user 102 and the customer 104 when the loss prevention component 512 is selected from the menu bar 502.

In an embodiment, the display 900 may be provided to the customer 104 based on the analysis conducted in relation to the chart 400 as depicted in FIG. 4. That is, the display 900 may be generated based on analysis and/or scoring by the cash flow tool based on a review of loss prevention data of the customer 104 (which can include any combination of payables and receivables transaction data).

In an embodiment, the display 900 can include a notification 902 advising the customer 104 that certain activities should be reviewed or adjusted to possibly increase efficiencies of the customer 104 in relation to loss prevention. The notification 902 can include an icon or other graphical component and/or a textual description. The display 900 can also include a presentation of efficient activities 904 of the customer 104. The presentation of efficient activities 904 can include a textual and/or graphical description of behavior or activities of the customer 104 that the cash flow tool considers efficient based on any analysis conducted in relation to chart 400. The display 900 can also include a presentation of inefficient activities 906 of the customer 104. The presentation of inefficient activities 906 can include a textual and/or graphical description of behavior or activities of the customer 104 that the cash flow tool considers inefficient based on any analysis conducted in relation to chart 400.

Overall, the cash flow tool can analyze and/or score transaction data related to loss prevention of the customer 104 based on, for example, the chart 400 and can generate the display 900 to summarize the analysis and/or scoring conducted. The analysis based on chart 400 can identify one or more efficient and/or one or more inefficient activities of the customer 104. The display 900 may be generated to present any determined efficient or inefficient activity to the customer 104. Any presented activity may be described textually and/or graphically with any inefficient activity also accompanied by a recommendation for addressing or correcting the determined inefficient activity. In this manner, very large amounts of loss prevention related transaction data for the customer 104 may be efficiently analyzed and presented to the customer 104 in a summarized manner to quickly identify areas or activities that may warrant review—for example, to improve the financial health of the customer 104.

Figure 10A:
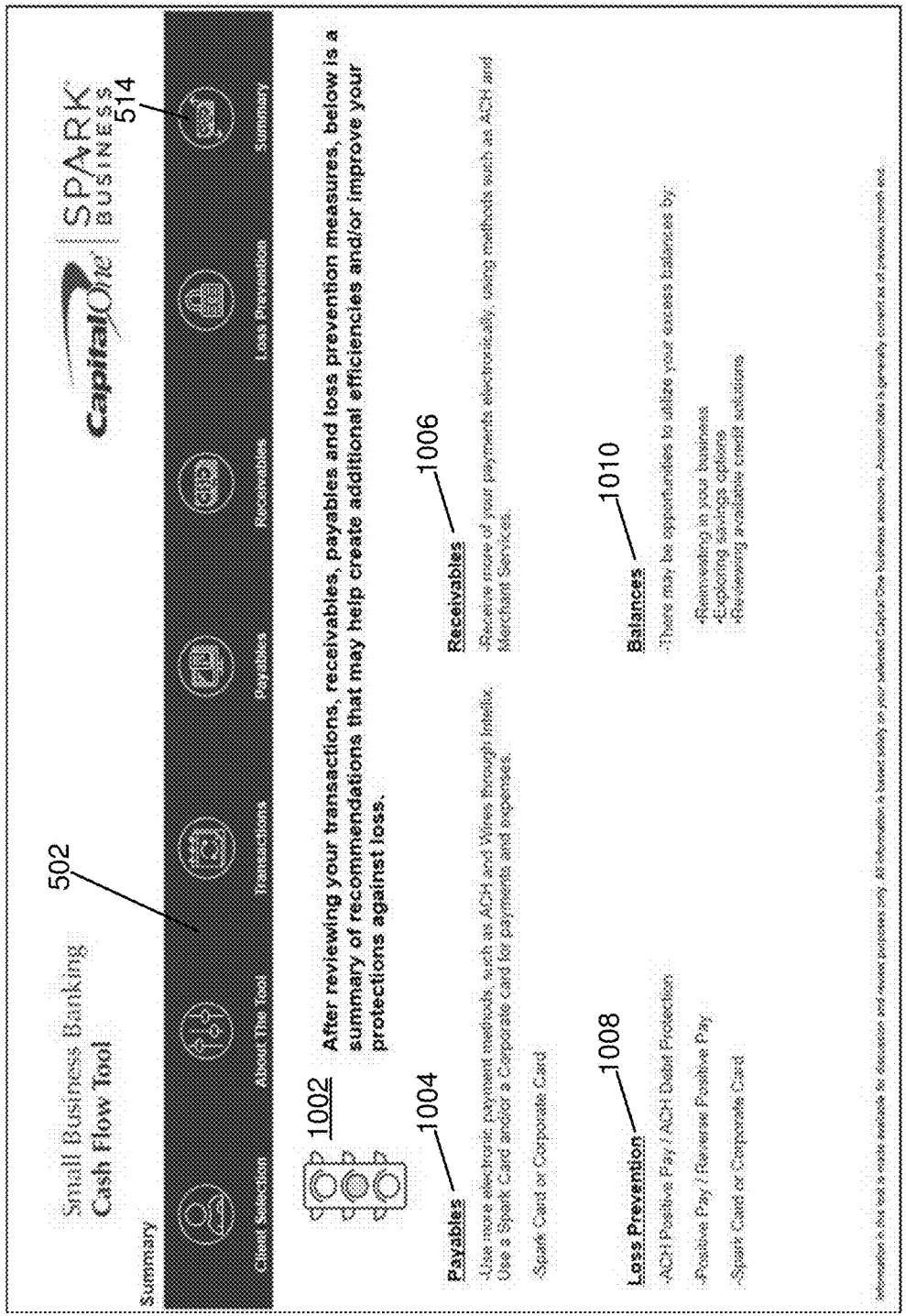

FIG. 10A illustrates a display 1000 that may be provided by the cash flow tool described herein. As an example, the display 1000 may be presented on a display of the computing device 106 based on data provided and/or generated by the cash flow tool. The display 1000 can include a presentation of textual and/or graphical information and components as shown. The display 1000 can represent a display provided to the user 102 and the customer 104 when the summary component 514 is selected from the menu bar 502.

In an embodiment, the display 1000 may be provided to the customer 104 based on the analysis conducted in relation to the charts 200, 300, and/or 400 and/or based on any analysis used to generate the displays 700, 800, or 900. That is, the display 1000 may be generated based on analysis and/or scoring by the cash flow tool based on a review of any transactional data of the customer 104.

In an embodiment, the display 1000 can include a notification 1002 advising the customer 104 that certain activities should be reviewed or adjusted to possibly increase efficiencies of the customer 104 in relation to loss prevention, receivables transactions, payables transactions, or maintained balances. The notification 1002 can include an icon or other graphical component and/or a textual description including, for example, an indication that the display 1000 provides a listing of recommendations to the customer 104 as determined by the cash flow tool.

In an embodiment, the display 1000 can include a presentation of recommendations related to payables transaction activity 1004 of the customer 104, a presentation of recommendations related to receivables transaction activity 1006 of the customer 104, a presentation of recommendations related to loss prevention activity 1008 of the customer 104, and/or a presentation of recommendations related to account balance activity 1010 of the customer 104. Each of the presented recommendations 1004-1010 may be provided textually and/or graphically.

The display 1000 provides a concise and efficient presentation of one or more recommendations to the customer 104 based on any transactional data of the customer 104 analyzed and/or scored by the cash flow tool. The display 1000 provides an efficient representation of recommendations that the user 102 can discuss with the customer 104 to determine ways to improve efficiencies of the customer 104. The displays 500-1000 can each represent user interface (UI) displays of the cash flow tool.

Figure 10B:

FIG. 10B illustrates a GUI 1020 that may be provided by the cash flow tool described herein. As an example, the GUI 1020 may be presented on a display of the computing device 106 based on data provided and/or generated by the cash flow tool. The GUI 1020 can include a presentation of textual and/or graphical information and components as shown. In an embodiment, the GUI 1020 may be generated based on the analysis conducted in relation to the charts 200, 300, and/or 400 and/or based on any analysis used to generate the displays 700, 800, 900, and/or 1000. That is, the GUI 1020 may be generated based on analysis and/or scoring by the cash flow tool based on a review of any transactional data of the customer 104.

As shown, the GUI 1020 is generally related to a Remote Deposit Capture Benefit Calculator, which allows a customer to view actual benefits to using a Remote Deposit Capture Service. For example, as shown, the user may provide input in field 1021 indicating how long it takes the user to travel to a physical banking location. Similarly, the user may provide input in field 1022 indicating the average hourly wage of the person making the deposits. GUI element 1023 may reflect an estimated number of trips to physical banking locations to deposit checks. In one embodiment, the cash flow tool computes the estimated number of trips in element 1023 based on the transactional data of the associated customer 104. In another embodiment, the user provides input specifying the estimated number of trips in element 1023.

Advantageously, the GUI 1020 depicts a computed time savings value 1024 which reflects the annual hours saved by using the Remote Deposit Capture Service instead of having a person make trips to the physical banking location to deposit checks. In one embodiment, the time savings value 1024 is computed based on the estimated number of trips 1023 and the amount of time required to travel to physical banking locations in field 1022 (e.g., multiplication of the time savings value 1024 converted to hours and the estimated number of trips 1023). Furthermore, the GUI 1020 depicts a cost savings value 1025 which reflects the amount of savings by using the Remote Deposit Capture Service instead of having a person make trips to the physical banking location to deposit checks. In one embodiment, the cost savings value 1025 is computed based on the time savings value 1024 and the average hourly wage in field 1022 (e.g., a multiplication of the time savings value 1024 and the average hourly wage value in field 1022).

In some embodiments, the GUI 1020 may depict additional information. For example, the cash flow tool may compute the actual amount of time required to travel to a physical branch location based on deposit dates in the transaction data, the branch the deposit was made, the business address of the branch, and traffic patterns at the time of each deposit. In such an example, the GUI 1020 may depict the actual time computed by the cash flow tool. As another example, the cash flow tool may compute fuel savings based on the actual travel time and output the fuel savings in the GUI 1020. Furthermore, the cash flow tool may compute one or more product recommendations based on an amount of deposited checks, number of checks deposited, and/or current product offerings. The cash flow tool may output the product recommendations for display in the GUI 1020 and/or a different GUI.

Figure 10C:
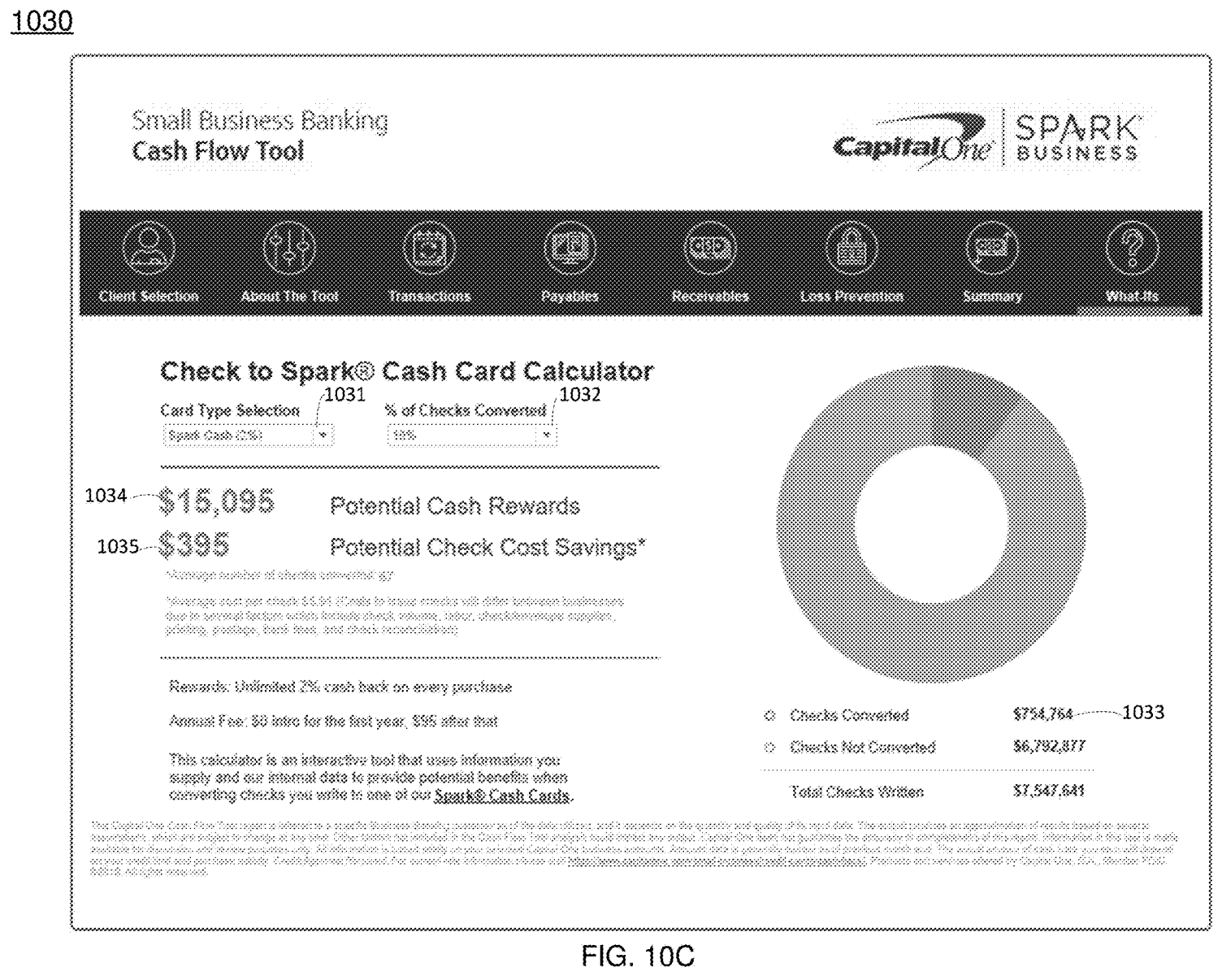

FIG. 10C illustrates a GUI 1030 that may be provided by the cash flow tool described herein. As an example, the GUI 1030 may be presented on a display of the computing device 106 based on data provided and/or generated by the cash flow tool. The GUI 1030 can include a presentation of textual and/or graphical information and components as shown. In an embodiment, the GUI 1030 may be provided to the customer 104 based on the analysis conducted in relation to the charts 200, 300, and/or 400 and/or based on any analysis used to generate the displays 700, 800, 900, 1000, and/or 1020. That is, the GUI 1030 may be generated based on analysis and/or scoring by the cash flow tool based on a review of any transactional data of the customer 104.

As shown, the GUI 1030 is generally related to a calculator which allows a user to view actual benefits to using a credit card in lieu of checks. For example, as shown, the customer may provide input in field 1031 to select one or more types of credit cards. Similarly, the user may provide input in field 1032 indicating the percentage of checks currently used by the customer that will be converted to credit card-based transactions.

Once the user enters input in fields 1031 and 1032, the cash flow tool may compute a checks converted value 1033 which reflects the multiplication of the value in input field 1032 to the total value of all checks written by the customer. In one embodiment, the cash flow tool programmatically generates the total value of all checks based on collected transaction data. Furthermore, as shown, the cash flow tool may compute a cash rewards value 1034 which depicts the amount of rewards the customer could earn by converting some check-based transactions to credit card-based transactions. In one embodiment, the cash flow tool computes the value 1034 by multiplying a rebate value associated with the card selected in field 1031 to the checks converted value 1033. Furthermore, as shown, the cash flow tool may compute a check savings value 1035, which reflects an "actual" cost savings by converting checks to credit card-based transactions. The cash flow tool may compute an actual cost savings per check based on labor, check reconciliation, supplies, postage, etc., for each check. In one embodiment, the cash flow tool computes the check savings value 1035 by multiplying the average number of checks converted and the actual cost savings value per check. The average number of checks converted may be computed by taking the dollar amount of checks converted (in element 1033) and dividing by the average amount of all checks written.

Furthermore, the cash flow tool may provide output in the GUI 1030 which reflects specific checks that can be converted based on who the payee is. For example, if merchant X accepts the credit card, the cash flow too may identify any checks written to merchant X as payee as candidates for conversion. Furthermore, the cash flow tool may make recommendations for different cards based on current account activity.

Figure 11:
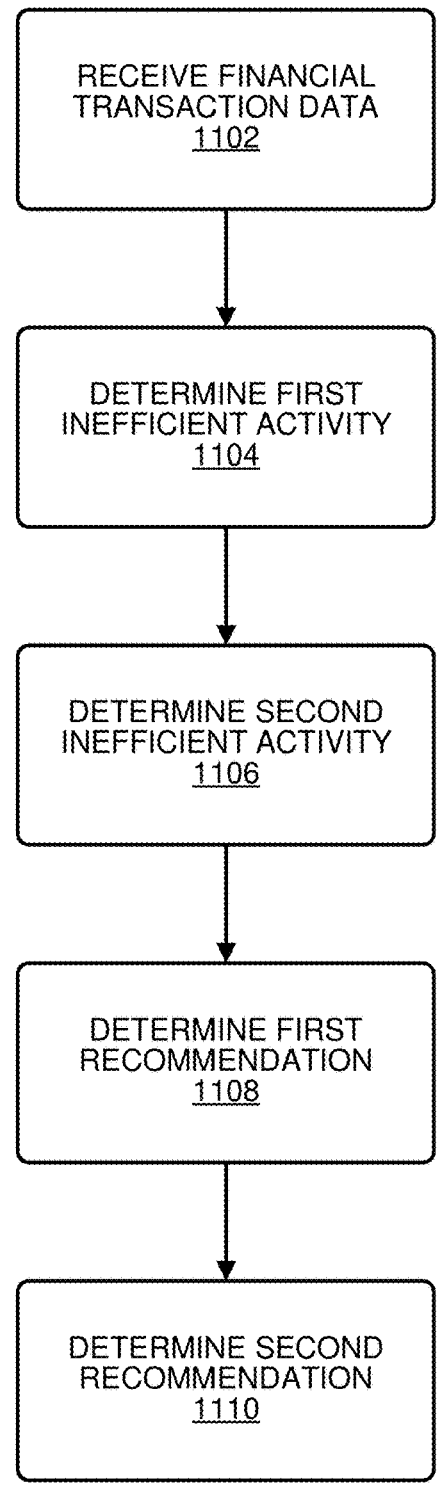
FIG. 11 illustrates a logic flow.

FIG. 11 flowchart illustrates an example of a logic flow 1100 that may be representative of techniques for providing a cash flow tool. For example, the logic flow 1100 may be representative of operations that may be performed in various embodiments by any constituent component of the operating environment 100 (e.g., one or more of the computing device 106, the first remote computing system 108, the second remote computing system 110, and the third remote computing system 112) depicted in FIG. 1. The logic flow 1100 may represent techniques for analyzing financial transaction data of a customer to determine efficient and/or inefficient activities of the customer and/or to determine means to address any determined inefficient activities.

At 1102, financial transaction data for a customer may be received. The financial transaction data can include payables transaction data and receivables transaction data. The financial transaction data may be received in one or more data streams from one or more remote or local computing devices.

At 1104, a first inefficient activity of the customer may be determined based on the payables transaction data. In an embodiment, the first inefficient activity may be determined based on determining a type of a payables transaction and a value of the payables transaction. Further, a first score for the first inefficient activity may be determined based on comparing the value of the payables transaction to a first threshold. The threshold used for comparison may be based on the determined type of the payables transaction. Additionally, a relatively low score may be determined if the value of the payables transaction is below the compared threshold and a relatively high score may be determined if the value of the payables transaction is above the compared threshold. A relatively low score for the payables transaction can result in the payables transaction being determined to be an inefficient activity. In an embodiment, the first score may be modified based on a weighting factor. In an embodiment, the analysis and techniques described in relation to the chart 200 may be used to determine the first inefficient activity based on the received payables transaction data and/or a specific payables transaction.

At 1106, a second inefficient activity of the customer may be determined based on the receivables transaction data. In an embodiment, the second inefficient activity may be determined based on determining a type of a receivables transaction and a value of the receivables transaction. Further, a second score for the second inefficient activity may be determined based on comparing the value of the receivables transaction to a second threshold. The threshold used for comparison may be based on the determined type of the receivables transaction. Additionally, a relatively low score may be determined if the value of the receivables transaction is below the compared threshold and a relatively high score may be determined if the value of the payables transaction is above the compared threshold. A relatively low score for the receivables transaction can result in the receivables transaction being determined to be an inefficient activity. In an embodiment, the second score may be modified based on a weighting factor. In an embodiment, the analysis and techniques described in relation to the chart 300 may be used to determine the first inefficient activity based on the received payables transaction data and/or a specific payables transaction.

At 1108, a first recommendation to address the first inefficient activity may be determined. In an embodiment, the first recommendation may be determined based on available financial services available to the customer through a financial institution. The first recommendation can include a graphical and/or a textual description and may be displayed to the customer (e.g., on a display of a computing device) in response to a first received input (e.g., a customer or other user clicking an icon on a display).

At 1110, a second recommendation to address the second inefficient activity may be determined. In an embodiment, the second recommendation may be determined based on available financial services available to the customer through a financial institution. The second recommendation can include a graphical and/or a textual description and may be displayed to the customer (e.g., on a display of a computing device) in response to a second received input (e.g., a customer or other user clicking an icon on a display).

FIG. 12 illustrates a storage medium 1200. Storage medium 1200 may represent an implementation of a storage device of any computing device that may operate within the operating environment 100 of FIG. 1. The storage medium 1200 can comprise any non-transitory computer-readable storage medium or machine-readable storage medium. In various embodiments, the storage medium 1200 can comprise a physical article of manufacture. In various embodiments, storage medium 1200 can store computer-executable instructions, such as computer-executable instructions to implement one or more of logic flows or operations described herein, such as the logic flow 1100 of FIG. 11. In various embodiments, storage medium 1200 can store computer-executable instructions, such as computer-executable instructions to implement any of the functionality described herein in relation to any described device, system, method, or apparatus. Furthermore, storage medium 1200 can store computer-executable instructions to implement the cash flow tool described herein with reference to FIGS. 1-11. Examples of a computer-readable storage medium or machine-readable storage medium can include any tangible media capable of storing electronic data. Examples of computer-executable instructions can include any type of computer readable code.

Figure 13:
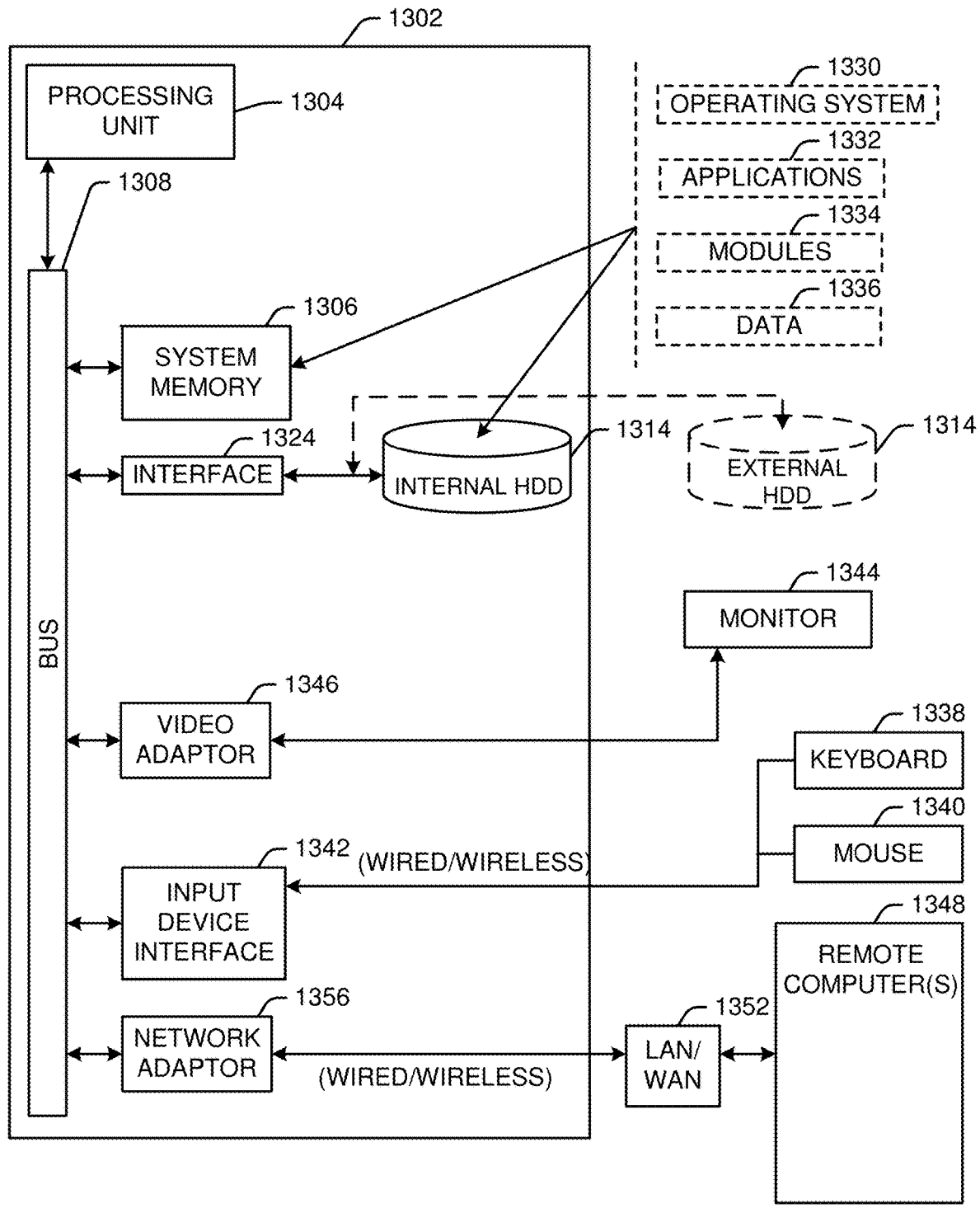
FIG. 13 illustrates a computing architecture.

FIG. 13 illustrates a computing architecture 1300 that can implement various embodiments described herein. In various embodiments, the computing architecture 1300 can comprise or be implemented as part of an electronic device and/or a computing device. In various embodiments, the computing architecture 1300 can represent an implementation of any constituent component of the operating environment 100 depicted in FIG. 1. One or more of the constituent components of the computing architecture 1300, and/or any constituent component of the operating environment 100, may be implemented in hardware, software, or any combination thereof including implementation based on a storage device (e.g., a memory unit) and logic, at least a portion of which is implemented in circuitry and coupled to the storage device. The logic may be or can include a processor or controller component such as, for example, a processor or controller that executes code stored in the storage device.

The computing architecture 1300 can include various common computing elements, such as one or more processors, multi-core processors, co-processors, memory units, chipsets, controllers, peripherals, interfaces, oscillators, timing devices, video cards, audio cards, multimedia input/ output (I/O) components, power supplies, and so forth.

As shown in FIG. 13, the computing architecture 1300 can comprise a computer 1302 having a processing unit 1304, a system memory 1306 and a system bus 1308. The processing unit 1304 may be any of various commercially available processors or may be a specially designed processor.

The system bus 1308 provides an interface for system components including, but not limited to, an interface between the system memory 1306 and the processing unit 1304. The system bus 1308 may be any of several types of bus structure that may further interconnect to a memory bus (with or without a memory controller), a peripheral bus, and a local bus using any of a variety of commercially available bus architectures.

The system memory 1306 can include any type of computer-readable storage media including any type of volatile and non-volatile memory. The computer 1302 can include any type of computer-readable storage media including an internal (or external) hard disk drive (HDD) 1314. In various embodiments, the computer 1302 can include any other type of disk drive such as for example, a magnetic floppy disk and/or an optical disk drive. The HDD 1314 may be connected to the system bus 1308 by a HDD interface 1324.

In various embodiments, any number of program modules may be stored in the drives and memory units 1306 and/or 1314 such as, for example, an operating system 1330, one or more application programs 1332, other program modules 1334, and program data 1336.

A user can enter commands and information into the computer 1302 through one or more wired/wireless input devices such as, for example, a keyboard 1338 and a pointing device, such as a mouse 1340. These and other input devices may be connected to the processing unit 1304 through an input device interface 1342 that is coupled to the system bus 1308. A monitor 1344 or other type of display device can also be connected to the system bus 1308 via an interface, such as a video adaptor 1346. The monitor 1344 may be internal or external to the computer 1302.

The computer 1302 may operate in a networked environment using logical connections via wired and/or wireless communications to one or more remote computers, such as a remote computer 1348. The remote computer 1348 may be a workstation, a server computer, a router, a personal computer, portable computer, microprocessor-based entertainment appliance, a smartphone, a tablet, a peer device or other common network node, and typically includes many or all of the elements described relative to the computer 1302. The logical connections depicted include wired and/or wireless connectivity to networks 1352 such as, for example, a local area network (LAN) and/or larger networks, for example, a wide area network (WAN). Networks 1352 can provide connectivity to a global communications network such as, for example, the Internet. A network adapter 1356 can facilitate wired and/or wireless communications to the networks 1352. The computer 1302 is operable to communicate over any known wired or wireless communication technology, standard, or protocol according to any known computer networking technology, standard, or protocol.

Figure 14:
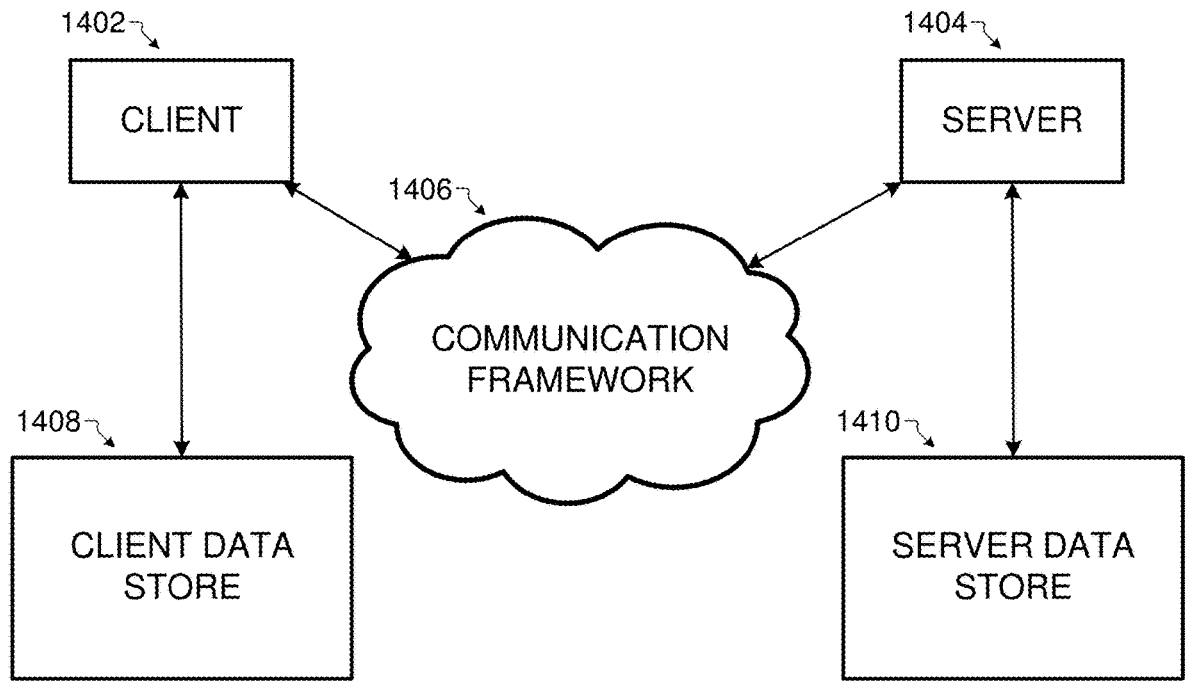
FIG. 14 illustrates a communication architecture.

FIG. 14 illustrates a block diagram of a communication architecture 1400. The communication architecture 1400 can implement various embodiments described herein. As shown in FIG. 14, the communication architecture 1400 comprises one or more clients 1402 and servers 1404. One of the clients 1402 and/or one of the servers 1404 can represent any constituent component of the operating environment 100 depicted in FIG. 1.

The client 1402 and the server 1404 may be operatively connected to a client data store 1408 and a server data store 710, respectively, that may be employed to store information local to the respective client 1402 and server 1404. In various embodiments, the client 1402 and/or the server 1404 can implement one or more of logic flows or operations described herein.

The client 1402 and the server 1404 can communicate data or other information between each other using a communications framework 1406. The communications framework 1406 can implement any known communications technique or protocol. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 1406 can operate over any communication media according to any networking technology including any wired or wireless communications standard or protocol, or any combination thereof.

Any of the financial and/or transactional data for the customer may be stored in one or more databases and may be received by a computing device to conduct the financial analysis described herein.

The following set of examples pertain to further embodiments.

Example 1 is a computing device comprising a storage device, a display, and logic, at least a portion of the logic implemented in circuitry coupled to the storage device and the display, the logic to receive financial transaction data for a customer, the financial transaction data including a payables transaction and a receivables transaction, the financial transaction data received in one or more data streams from at least one of a plurality of computing devices, determine a first inefficient activity of the customer based on the payables transaction, the logic to determine the first inefficient activity based on determining a type of the payables transaction and a value of the payables transaction, determine a second inefficient activity of the customer based on the receivables transaction, the logic to determine the second inefficient activity based on determining a type of the receivables transaction and a value of the receivables transaction, determine a first recommendation to address the first inefficient activity, determine a second recommendation to address the second inefficient activity, display on the display, based upon a first received input, at least a first textual description and a first graphical description of the first inefficient activity and the first recommendation to address the first inefficient activity, and display on the display, based upon a second received input, at least a second textual description and a second graphical description of the second inefficient activity and the second recommendation to address the second inefficient activity.

Example 2 is an extension of Example 1 or any other example disclosed herein, the logic to determine a first efficient activity based on the determined type of the payables transaction and the value of the payables transaction and to display on the display, based upon the first received input, at least a third textual description and a third graphical description of the first efficient activity.

Example 3 is an extension of Example 2 or any other example disclosed herein, the logic to determine a second efficient activity based on the determined type of the receivables transaction and the value of the receivables transaction and to display on the display, based upon the second received input, at least a fourth textual description and a fourth graphical description of the second efficient activity.

Example 4 is an extension of Example 3 or any other example disclosed herein, the logic to determine a third inefficient activity of the customer based on at least one of the payables transaction and the receivables transaction and to determine a third recommendation to address the third inefficient activity, the third inefficient activity relating to a financial loss.

Example 5 is an extension of Example 4 or any other example disclosed herein, the logic to display on the display, based upon a third received input, at least a fifth textual and a fifth graphical description of the third inefficient activity and the third recommendation to address the third inefficient activity.

Example 6 is an extension of Example 5 or any other example disclosed herein, the logic to determine a first score for the first inefficient activity based on comparing the value of the payables transaction to a first threshold and to determine a second score for the second inefficient activity based on comparing the value of the receivables transaction to a second threshold.

Example 7 is an extension of Example 6 or any other example disclosed herein, the logic to modify at least one of the first score and the second score based on a weighting factor.

Example 8 is an extension of Example 6 or any other example disclosed herein, the logic to determine the first recommendation based on the first score and to determine the second recommendation based on the second score.

Example 9 is a method comprising receiving financial transaction data for a customer, the financial transaction data including a payables transaction and a receivables transaction, the financial transaction data received in one or more data streams from at least one of a plurality of computing devices, determining a first inefficient activity of the customer based on the payables transaction, the logic to determine the first inefficient activity based on determining a type of the payables transaction and a value of the payables transaction, determining a second inefficient activity of the customer based on the receivables transaction, the logic to determine the second inefficient activity based on determining a type of the receivables transaction and a value of the receivables transaction, determining a first recommendation to address the first inefficient activity, determining a second recommendation to address the second inefficient activity, displaying on a display, based upon a first received input, at least a first textual description and a first graphical description of the first inefficient activity and the first recommendation to address the first inefficient activity, and displaying on the display, based upon a second received input, at least a second textual description and a second graphical description of the second inefficient activity and the second recommendation to address the second inefficient activity.

Example 10 is an extension of Example 9 or any other example disclosed herein, further comprising determining a first efficient activity based on the determined type of the payables transaction and the value of the payables transaction and displaying on the display, based upon the first received input, at least a third textual description and a third graphical description of the first efficient activity.

Example 11 is an extension of Example 10 or any other example disclosed herein, further comprising determining a second efficient activity based on the determined type of the receivables transaction and the value of the receivables transaction and displaying on the display, based upon the second received input, at least a fourth textual description and a fourth graphical description of the second efficient activity.

Example 12 is an extension of Example 11 or any other example disclosed herein, further comprising determining a third inefficient activity of the customer based on at least one of the payables transaction and the receivables transaction and to determine a third recommendation to address the third inefficient activity, the third inefficient activity relating to a financial loss.

Example 13 is an extension of Example 12 or any other example disclosed herein, further comprising displaying on the display, based upon a third received input, at least a fifth textual description and a fifth graphical description of the third inefficient activity and the third recommendation to address the third inefficient activity.

Example 14 is an extension of Example 13 or any other example disclosed herein, further comprising determining a first score for the first inefficient activity based on comparing the value of the payables transaction to a first threshold and to determine a second score for the second inefficient activity based on comparing the value of the receivables transaction to a second threshold.

Example 15 is at least one non-transitory computer-readable medium comprising a set of instructions that, in response to being executed on a computing device, cause the computing device to receive financial transaction data for a customer, the financial transaction data including a payables transaction and a receivables transaction, the financial transaction data received in one or more data streams from at least one of a plurality of computing devices, determine a first inefficient activity of the customer based on the payables transaction, the logic to determine the first inefficient activity based on determining a type of the payables transaction and a value of the payables transaction, determine a second inefficient activity of the customer based on the receivables transaction, the logic to determine the second inefficient activity based on determining a type of the receivables transaction and a value of the receivables transaction, determine a first recommendation to address the first inefficient activity, determine a second recommendation to address the second inefficient activity, display on a display, based upon a first received input, at least a first textual description and a first graphical description of the first inefficient activity and the first recommendation to address the first inefficient activity, and display on the display, based upon a second received input, at least a second textual description and a second graphical description of the second inefficient activity and the second recommendation to address the second inefficient activity.

Example 16 is an extension of Example 15 or any other example disclosed herein, the computing device to determine a first efficient activity based on the determined type of the payables transaction and the value of the payables transaction and to display on the display, based upon the first received input, at least a third textual description and a third graphical description of the first efficient activity.

Example 17 is an extension of Example 16 or any other example disclosed herein, the computing device to determine a second efficient activity based on the determined type of the receivables transaction and the value of the receivables transaction and to display on the display, based upon the second received input, at least a fourth textual description and a fourth graphical description of the second efficient activity.

Example 18 is an extension of Example 17 or any other example disclosed herein, the computing device to determine a third inefficient activity of the customer based on at least one of the payables transaction and the receivables transaction and to determine a third recommendation to address the third inefficient activity, the third inefficient activity relating to a financial loss.

Example 19 is an extension of Example 18 or any other example disclosed herein, the computing device to display on the display, based upon a third received input, at least a fifth textual description and a fifth graphical description of the third inefficient activity and the third recommendation to address the third inefficient activity.

Example 20 is an extension of Example 19 or any other example disclosed herein, the computing device to determine a first score for the first inefficient activity based on comparing the value of the payables transaction to a first threshold and to determine a second score for the second inefficient activity based on comparing the value of the receivables transaction to a second threshold.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It may be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:
1. A computing device, comprising:
   a processor;
   a display coupled to the processor; and
   a memory storing instructions which when executed by the processor cause the processor to:
      receive financial transaction data for a customer, the financial transaction data including a payables transaction and a receivables transaction, the financial transaction data received in one or more data streams from at least one of a plurality of computing devices;
      determine a first inefficient activity of the customer based on the payables transaction, a determined type of the payables transaction, and a determined value of the payables transaction;
      determine a second inefficient activity of the customer based on the receivables transaction, a determined type of the receivables transaction, and a determined value of the receivables transaction;
      determine a first recommendation addressing the first inefficient activity;

determine a second recommendation addressing the second inefficient activity;
display a graphical user interface (GUI) comprising a payables element and a receivables element on the display;
display on the display, based upon a first received input selecting the payables element of the GUI, at least a first textual description and a first graphical description of the first inefficient activity and the first recommendation addressing the first inefficient activity; and
display on the display, based upon a second received input selecting the payables element of the GUI, at least a second textual description and a second graphical description of the second inefficient activity and the second recommendation addressing the second inefficient activity.

2. The computing device of claim 1, the memory storing instructions which when executed by the processor cause the processor to:
determine a first efficient activity based on the determined type of the payables transaction and the value of the payables transaction; and
display on the display, based upon the first received input, at least a third textual description and a third graphical description of the first efficient activity.

3. The computing device of claim 2, the memory storing instructions which when executed by the processor cause the processor to:
determine a second efficient activity based on the determined type of the receivables transaction and the value of the receivables transaction; and
display on the display, based upon the second received input, at least a fourth textual description and a fourth graphical description of the second efficient activity.

4. The computing device of claim 3, the memory storing instructions which when executed by the processor cause the processor to:
determine a third inefficient activity of the customer based on at least one of the payables transaction and the receivables transaction; and
determine a third recommendation to address the third inefficient activity, the third inefficient activity relating to a financial loss.

5. The computing device of claim 4, the memory storing instructions which when executed by the processor cause the processor to:
display on the display, based upon a third received input, at least a fifth textual description and a fifth graphical description of the third inefficient activity and the third recommendation addressing the third inefficient activity.

6. The computing device of claim 5, the memory storing instructions which when executed by the processor cause the processor to:
to determine a first score for the first inefficient activity based on comparing the value of the payables transaction to a first threshold; and
determine a second score for the second inefficient activity based on comparing the value of the receivables transaction to a second threshold.

7. The computing device of claim 6, the memory storing instructions which when executed by the processor cause the processor to modify at least one of the first score and the second score based on a weighting factor.

8. The computing device of claim 6, the memory storing instructions which when executed by the processor cause the processor to determine the first recommendation based on the first score and to determine the second recommendation based on the second score.

9. A method, comprising:
Receiving, by a processor, financial transaction data for a customer, the financial transaction data including a payables transaction and a receivables transaction, the financial transaction data received in one or more data streams from at least one of a plurality of computing devices;
determining, by the processor, a first inefficient activity of the customer based on the payables transaction, a determined type of the payables transaction, and a determined value of the payables transaction;
determining, by the processor, a second inefficient activity of the customer based on the receivables transaction, a determined type of the receivables transaction, and a determined value of the receivables transaction;
determining, by the processor, a first recommendation addressing the first inefficient activity;
determining, by the processor, a second recommendation addressing the second inefficient activity;
displaying a graphical user interface (GUI) comprising a payables element and a receivables element on the display;
displaying on display, based upon a first received input selecting the payables element of the GUI, at least a first textual description and a first graphical description of the first inefficient activity and the first recommendation to address the first inefficient activity; and
displaying on the display, based upon a second received input selecting the payables element of the GUI, at least a second textual description and a second graphical description of the second inefficient activity and the second recommendation addressing the second inefficient activity.

10. The method of claim 9, further comprising
determining, by the processor, a first efficient activity based on the determined type of the payables transaction and the value of the payables transaction; and
displaying on the display, based upon the first received input, at least a third textual description and a third graphical description of the first efficient activity.

11. The method of claim 10, further comprising
determining, by the processor, a second efficient activity based on the determined type of the receivables transaction and the value of the receivables transaction; and
displaying on the display, based upon the second received input, at least a fourth textual description and a fourth graphical description of the second efficient activity.

12. The method of claim 11, further comprising
determining, by the processor, a third inefficient activity of the customer based on at least one of the payables transaction and the receivables transaction; and
determining, by the processor, a third recommendation addressing the third inefficient activity, the third inefficient activity relating to a financial loss.

13. The method of claim 12, further comprising displaying on the display, based upon a third received input, at least a fifth textual description and a fifth graphical description of the third inefficient activity and the third recommendation addressing the third inefficient activity.

14. The method of claim 13, further comprising
determining, by the processor, a first score for the first inefficient activity based on comparing the value of the payables transaction to a first threshold; and determining, by the processor, a second score for the second inefficient activity based on comparing the value of the receivables transaction to a second threshold.

15. At least one non-transitory computer-readable medium comprising a set of instructions that, in response to being executed on a computing device, cause the computing device to:
- receive financial transaction data for a customer, the financial transaction data including a payables transaction and a receivables transaction, the financial transaction data received in one or more data streams from at least one of a plurality of computing devices;
- determine a first inefficient activity of the customer based on the payables transaction, a determined type of the payables transaction, and a determined value of the payables transaction;
- determine a second inefficient activity of the customer based on the receivables transaction, a determined type of the receivables transaction, and a determined value of the receivables transaction;
- determine a first recommendation addressing the first inefficient activity;
- determine a second recommendation addressing the second inefficient activity;
- display a graphical user interface (GUI) comprising a payables element and a receivables element on a display;
- display on the display, based upon a first received input, at least a first textual description and a first graphical description of the first inefficient activity and the first recommendation to address the first inefficient activity; and
- display on the display, based upon a second received input selecting the payables element of the GUI, at least a second textual description and a second graphical description of the second inefficient activity and the second recommendation addressing the second inefficient activity.

16. The at least one non-transitory computer-readable medium of claim 15, the computing device to determine a first efficient activity based on the determined type of the payables transaction and the value of the payables transaction and to display on the display, based upon the first received input, at least a third textual description and a third graphical description of the first efficient activity.

17. The at least one non-transitory computer-readable medium of claim 16, the computing device to determine a second efficient activity based on the determined type of the receivables transaction and the value of the receivables transaction and to display on the display, based upon the second received input, at least a fourth textual description and a fourth graphical description of the second efficient activity.

18. The at least one non-transitory computer-readable medium of claim 17, the computing device to determine a third inefficient activity of the customer based on at least one of the payables transaction and the receivables transaction and to determine a third recommendation addressing the third inefficient activity, the third inefficient activity relating to a financial loss.

19. The at least one non-transitory computer-readable medium of claim 18, the computing device to display on the display, based upon a third received input, at least a fifth textual description and a fifth graphical description of the third inefficient activity and the third recommendation addressing the third inefficient activity.

20. The at least one non-transitory computer-readable medium of claim 19, the computing device to determine a first score for the first inefficient activity based on comparing the value of the payables transaction to a first threshold and to determine a second score for the second inefficient activity based on comparing the value of the receivables transaction to a second threshold.

* * * * *